US006363594B1

(12) United States Patent
Jahani et al.

(10) Patent No.: US 6,363,594 B1
(45) Date of Patent: Apr. 2, 2002

(54) APPARATUS FOR MOUNTING A SLEEVE ON A SPINDLE

(75) Inventors: Hooshang Jahani, Fremont; Scott R. Bruner; Oleg Gratchev, both of San Jose, all of CA (US)

(73) Assignee: Tooltek Engineering Corporation, Fremont, CA (US)

( * ) Notice: Subject to any disclaimer, the term of this patent is extended or adjusted under 35 U.S.C. 154(b) by 0 days.

(21) Appl. No.: 09/467,930

(22) Filed: Dec. 21, 1999

(51) Int. Cl.[7] .............................. B23P 19/02; B23P 11/02
(52) U.S. Cl. ............................................. 29/235; 29/450
(58) Field of Search .......................... 29/235, 450, 234, 29/235.5, 236; 100/9; 269/104, 105, 156

(56) References Cited

U.S. PATENT DOCUMENTS

| 719,938 | A | * | 2/1903 | Gorrell ..................... 269/156 |
|---|---|---|---|---|
| 1,488,901 | A | * | 4/1924 | Armstrong ................. 29/235 |
| 2,038,840 | A | * | 4/1936 | Hall .......................... 29/235 |
| 4,078,539 | A | * | 3/1978 | Sprague ................... 269/156 |
| 4,144,631 | A | * | 3/1979 | Fujio ......................... 29/235 |
| 4,385,427 | A | * | 5/1983 | Fraiser ..................... 29/91.5 |
| 4,391,028 | A | * | 7/1983 | Choudhury et al. ........ 29/235 |
| 4,736,506 | A | * | 4/1988 | Hanebrink ................. 29/235 |
| 4,899,428 | A | * | 2/1990 | Hsu .......................... 29/235 |
| 4,924,738 | A | * | 5/1990 | Che ......................... 269/156 |
| 5,199,144 | A | * | 4/1993 | Abe et al. .................. 29/235 |
| 5,774,965 | A | * | 7/1998 | Mintz et al. ................ 29/235 |
| 6,049,960 | A | * | 4/2000 | Pilling et al. ............... 29/235 |
| 6,298,532 | B1 | * | 10/2001 | Walt .......................... 29/235 |

FOREIGN PATENT DOCUMENTS

| FR | 755114 | * | 11/1933 | ................. 29/235 |
|---|---|---|---|---|
| FR | 2501163 | * | 9/1982 | ................. 29/235 |
| GB | 2092708 | * | 8/1982 | ................. 29/450 |
| JP | 55-83537 | * | 11/1933 | ................. 29/235 |

* cited by examiner

*Primary Examiner*—S. Thomas Hughes
*Assistant Examiner*—Marc Jimenez
(74) *Attorney, Agent, or Firm*—Burns Doane Swecker & Mathis LLP

(57) ABSTRACT

An apparatus for mounting a sleeve on a spindle includes a frame, and a finger arrangement movably mounted on the frame, the finger arrangement including a plurality of fingers arranged at a common first radius around an imaginary centerline of the finger arrangement, the fingers being movable radially outwardly from the first radius to a second radius upon application of an outwardly directed force. A sleeve having an internal opening in which the fingers are disposed is adapted to be mounted on a stationary spindle by movement of the finger arrangement on the frame toward the spindle. A method for mounting a sleeve on a spindle is also disclosed.

21 Claims, 7 Drawing Sheets

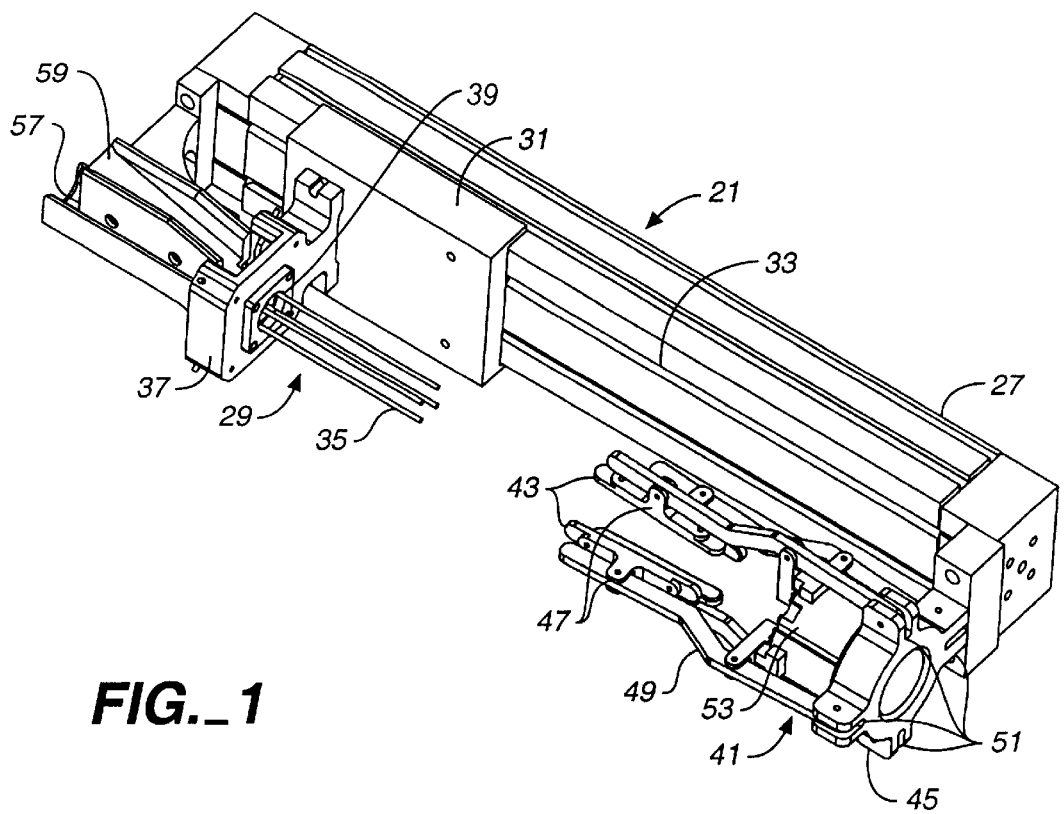
FIG._1
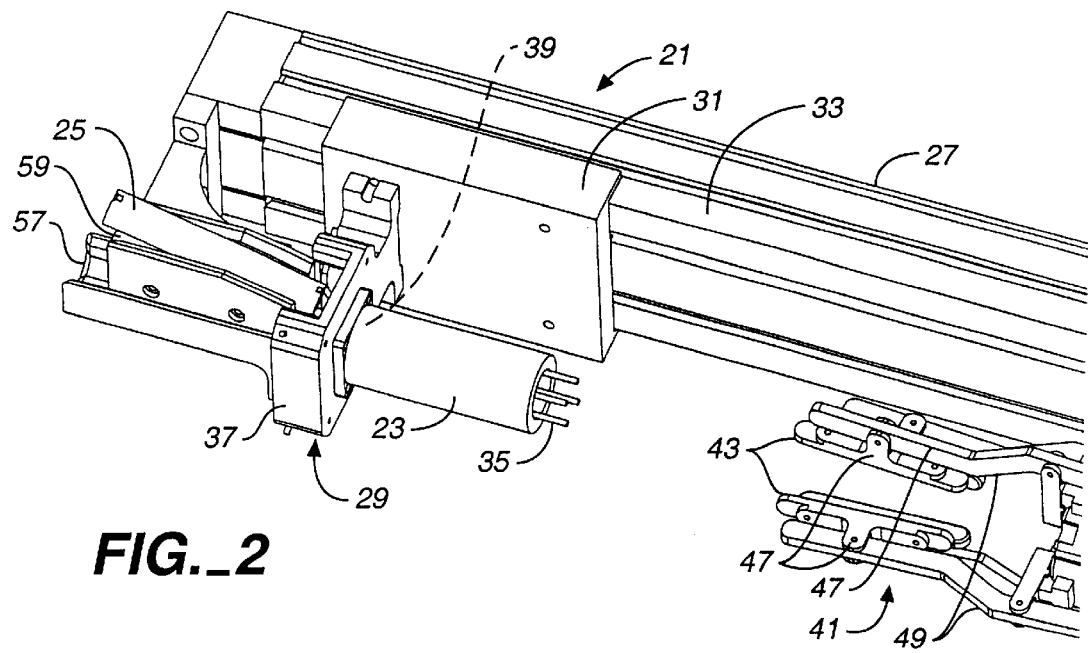
FIG._2

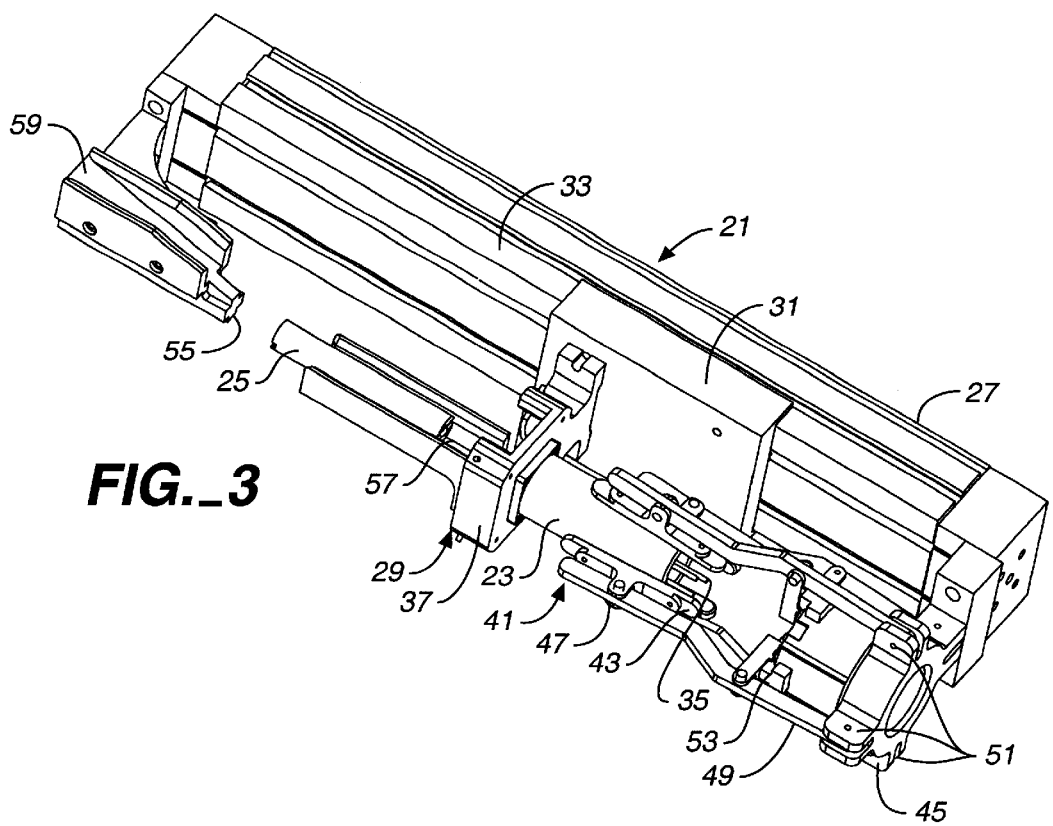
FIG._3
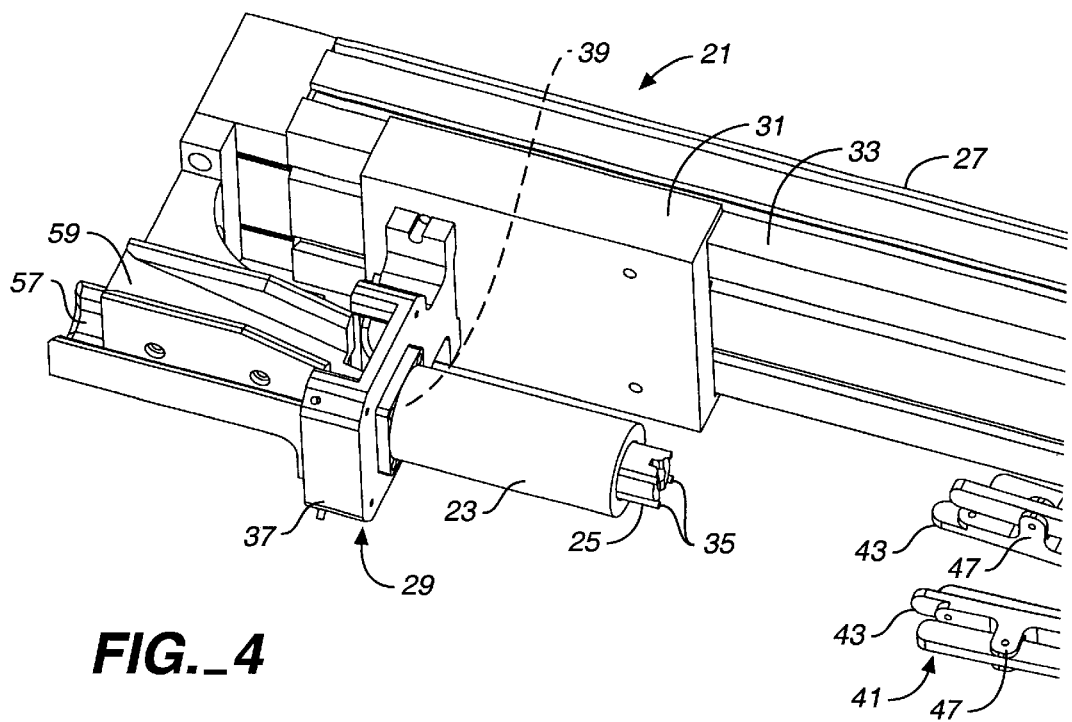
FIG._4

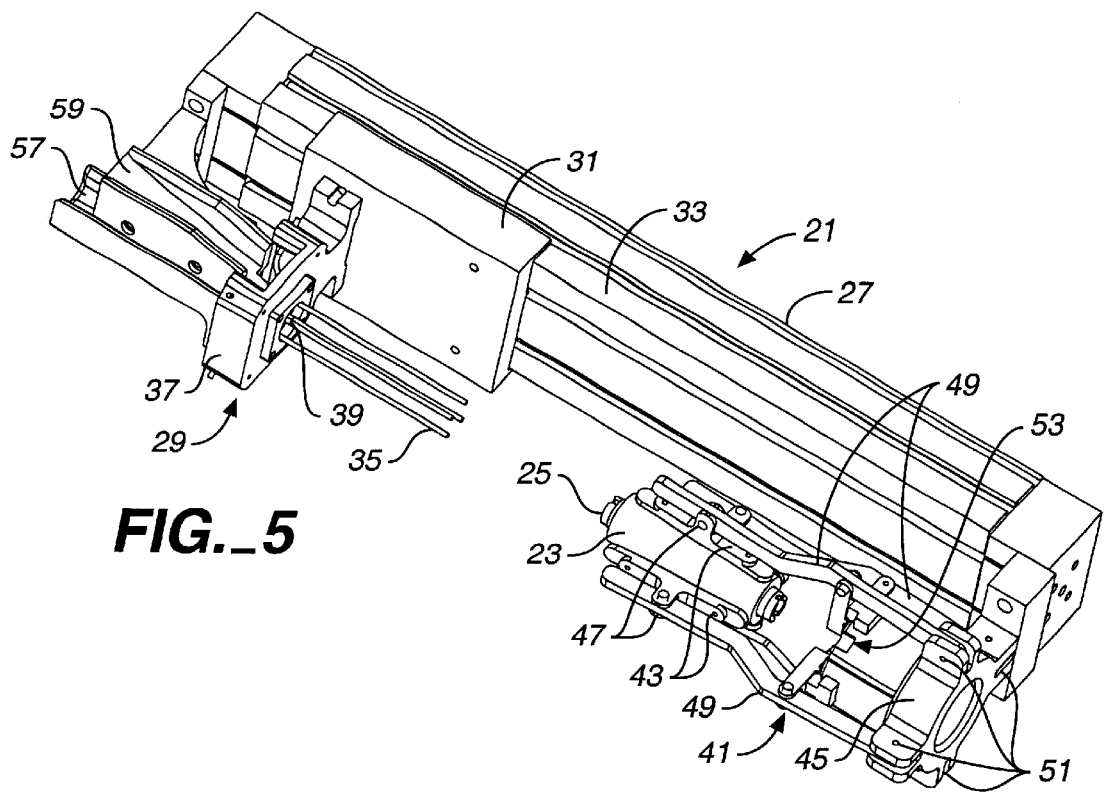
FIG._5
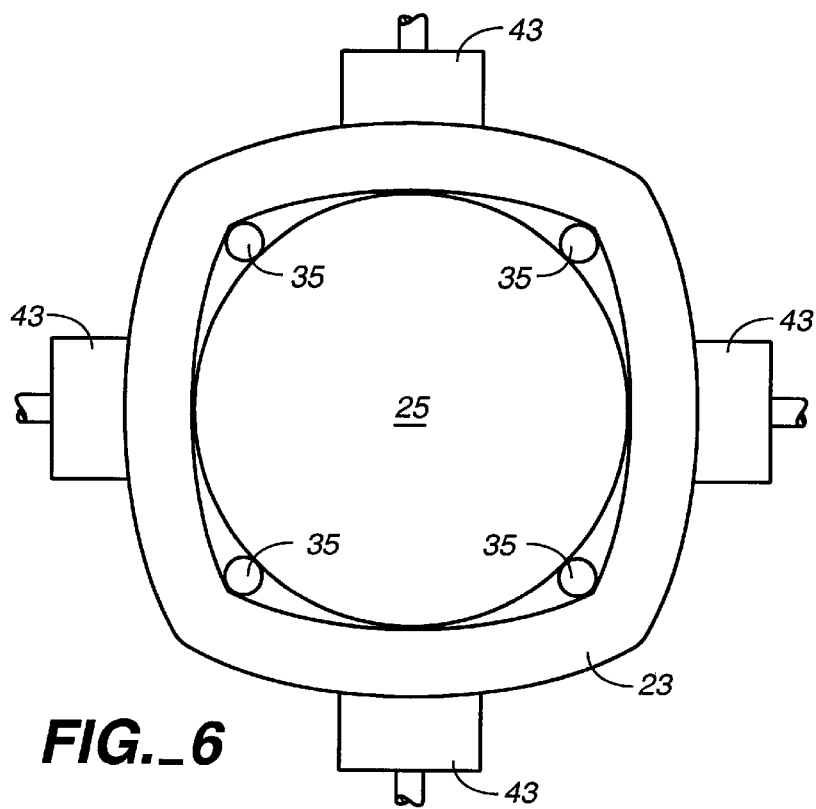
FIG._6

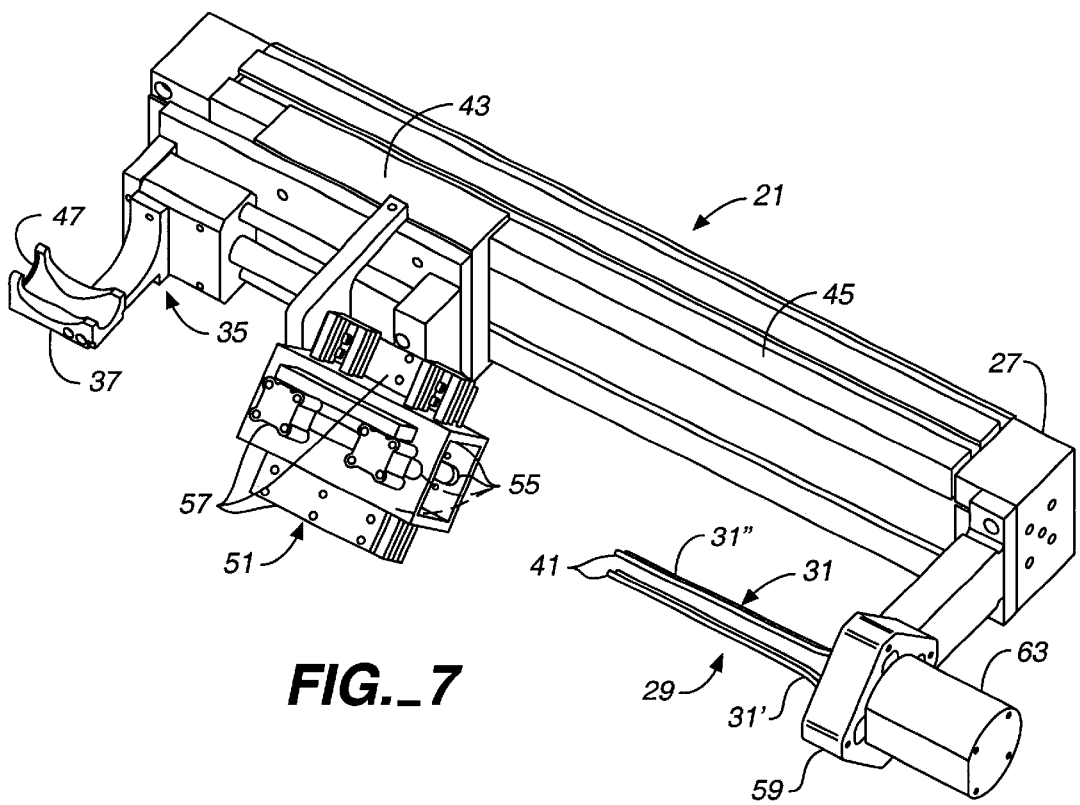
FIG._7
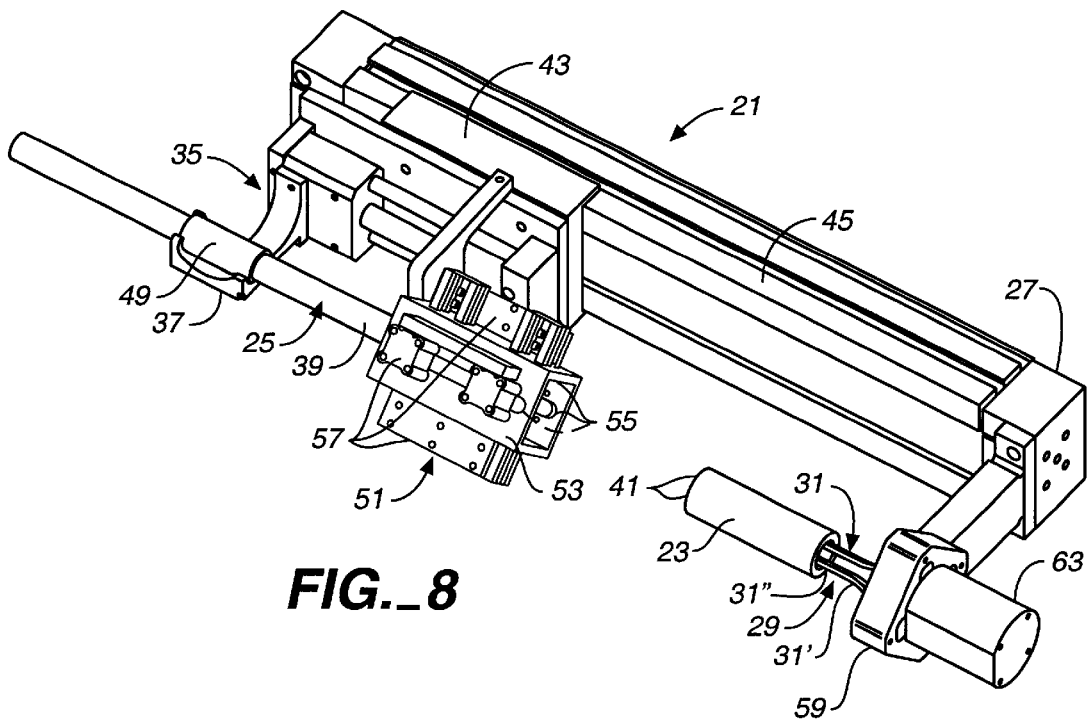
FIG._8

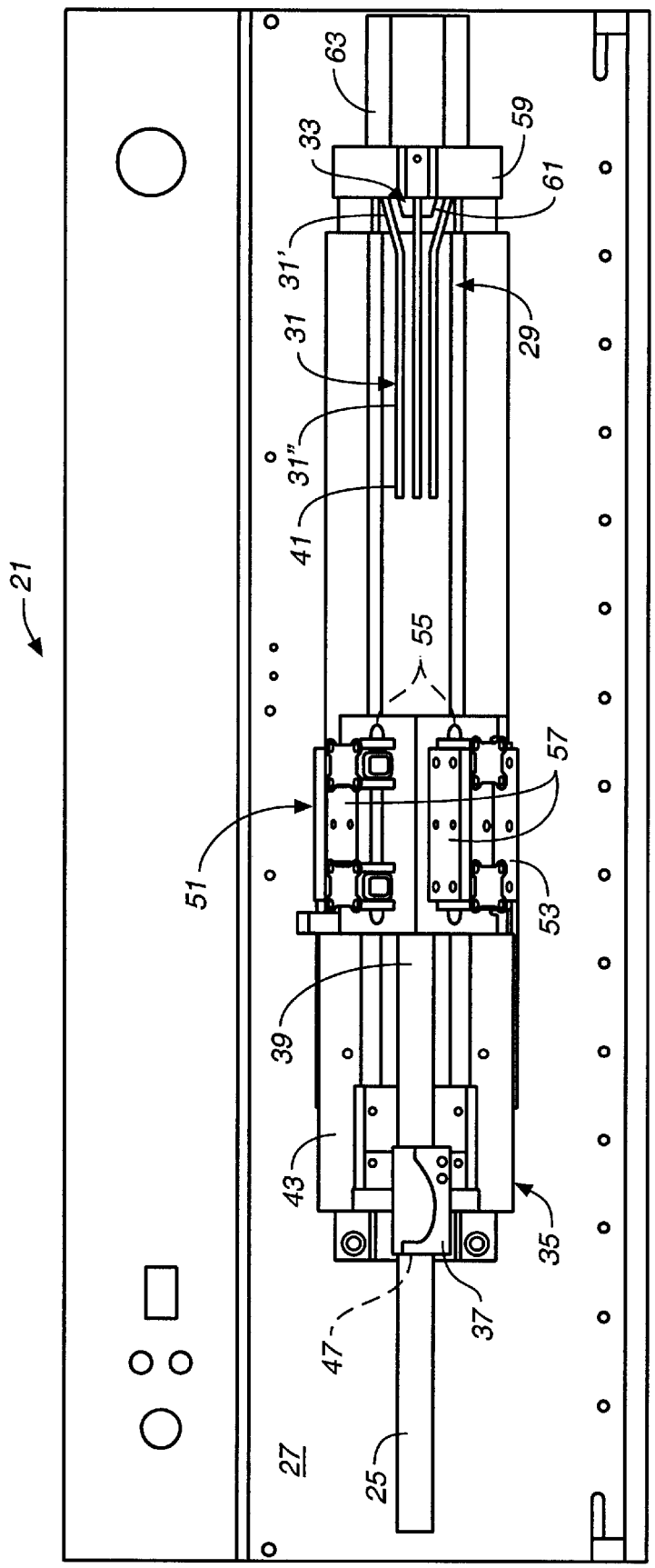
FIG._9

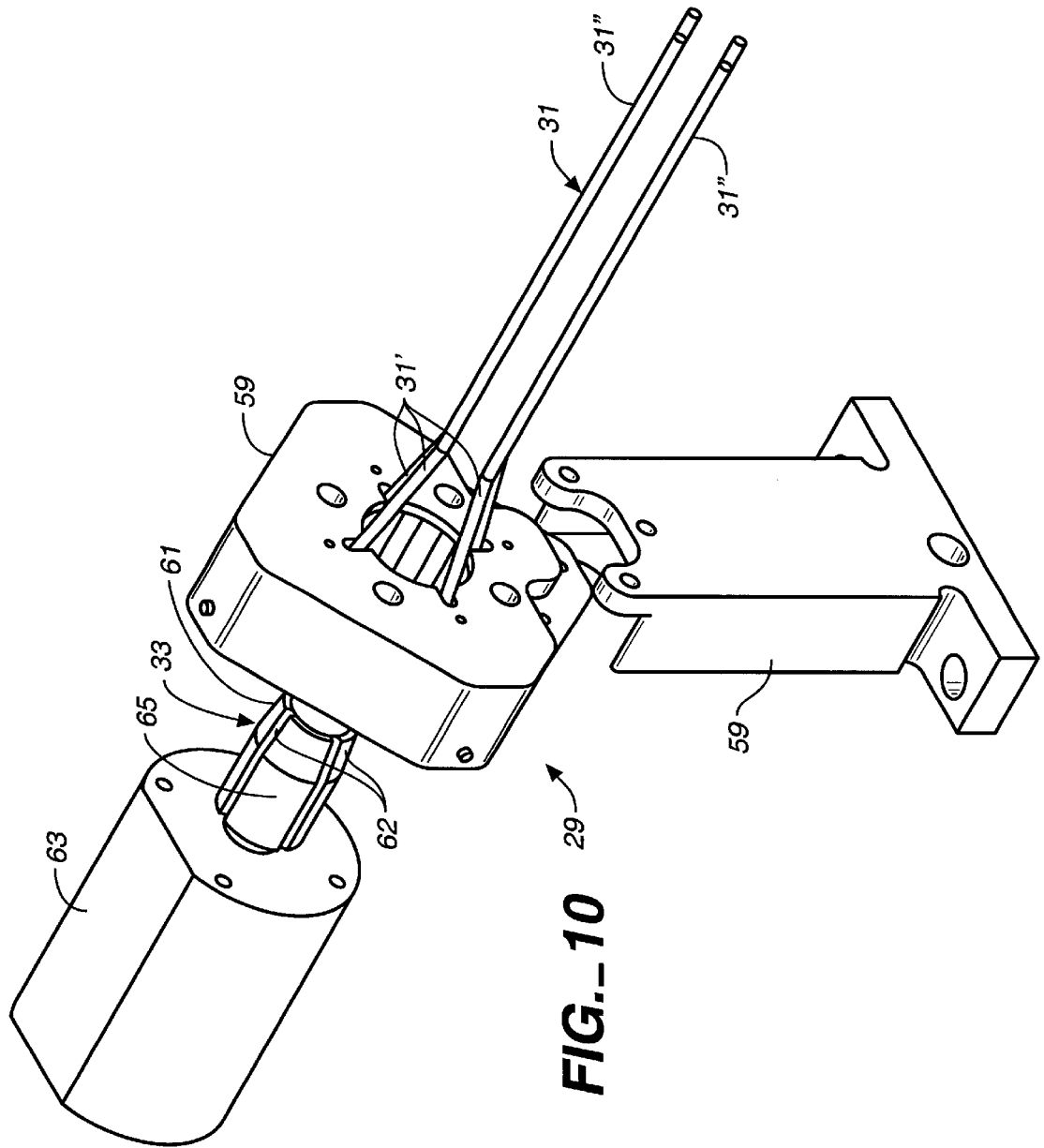
FIG._10

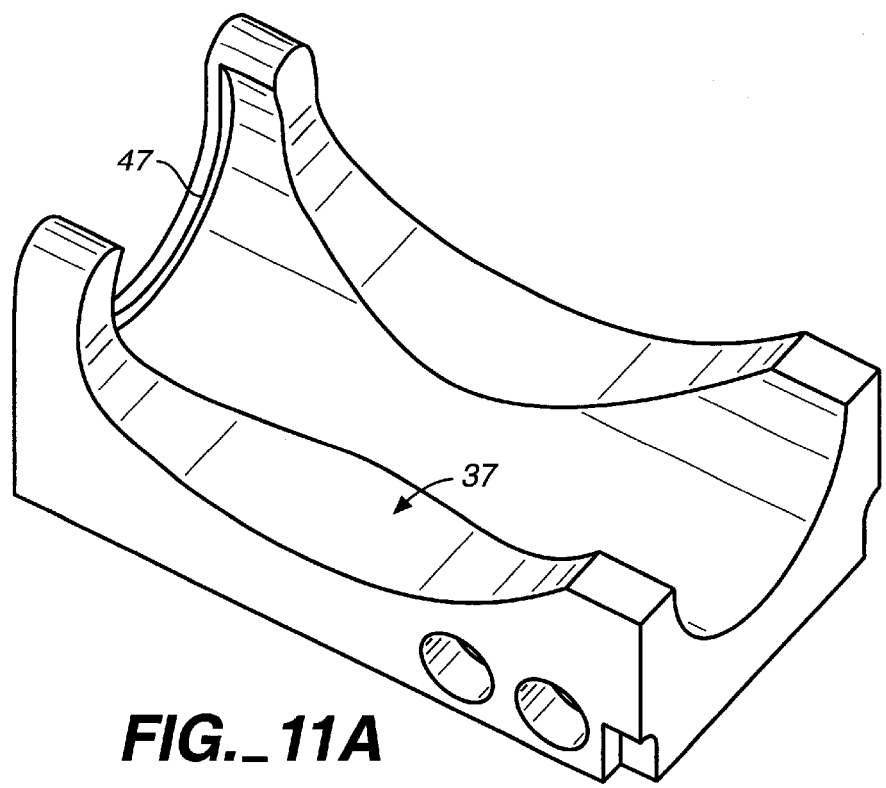
FIG._11A
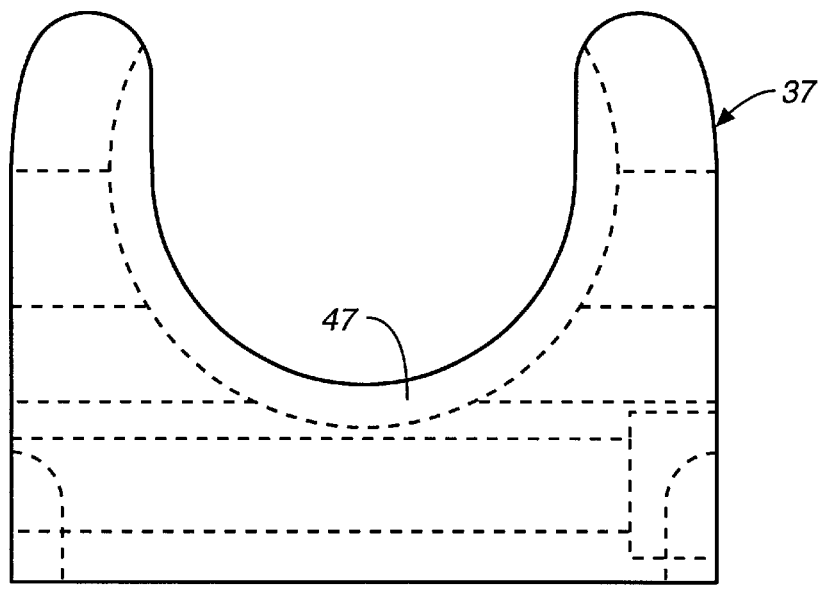
FIG._11B

APPARATUS FOR MOUNTING A SLEEVE ON A SPINDLE

FIELD OF THE INVENTION

The present invention relates to apparatus and methods for mounting sleeves on spindles and, more particularly, to mounting cylindrical sleeve brushes made of PVA or similar materials on spindles.

BACKGROUND AND SUMMARY

Effective contact cleaning of high technology substrates depends on consistent and uniform mounting of the cylindrical sleeve brushes used for such cleaning on their drive spindles. Typically, the mounting process is accomplished by hand, with or without the use of a brush spreading sleeve. In all cases, the accuracy and uniformity of the brush placement on the spindle is operator dependent. Poor installation of brushes can increase substrate particle counts by more than 300%, with corresponding reductions in final product yields.

Loading a wet PVA (or similar material) brush on a TEFLON spindle is a difficult chore. The PVA can tend to bunch and tear. The need to center the brush on the spindle compounds the problem even more. Simple sleeves can ease the process but still require a high degree of operator expertise and consistency. It is desirable to provide an apparatus and method that reduces operator dependency, and permits quick, consistent loading of brushes on spindles.

The present invention permits providing an apparatus and method for loading a sleeve such as a brush on a spindle that reduces operator dependency, and permits quick, consistent loading of sleeves on spindles.

In accordance with one aspect of the present invention, an apparatus for mounting a sleeve on a spindle includes a frame, and a finger arrangement movably mounted on the frame, the finger arrangement including a plurality of fingers arranged at a common first radius around an imaginary centerline of the finger arrangement, the fingers being movable radially outwardly from the first radius to a second radius upon application of an outwardly directed force. A sleeve having an internal opening in which the fingers are disposed is adapted to be mounted on a stationary spindle by movement of the finger arrangement on the frame toward the spindle.

In accordance with another aspect of the present invention, a method for loading a sleeve having an inner sleeve radius on a spindle having an outer spindle radius at least as large as the inner sleeve radius is provided. According to the method, a sleeve having an internal opening having an inner sleeve radius is loaded on a finger arrangement including a plurality of fingers arranged at a common first radius around an imaginary centerline of the finger arrangement, the first radius being no larger than the sleeve radius. The fingers are moved radially outwardly from the first radius to a second radius larger than an outer spindle radius of a spindle. The spindle is installed in the internal opening of the sleeve.

BRIEF DESCRIPTION OF THE DRAWINGS

The features and advantages of the present invention are well understood by reading the following detailed description in conjunction with the drawings in which like numerals indicate similar elements and in which:

FIG. 1 is a perspective view of an apparatus according to an embodiment of the present invention prior to loading a spindle and a sleeve;

FIG. 2 is a perspective view of a portion of the apparatus according to FIG. 1 upon initially loading a spindle and a sleeve;

FIG. 3 is a perspective view of a portion of the apparatus according to FIG. 1 shown prior to installation of the spindle in the sleeve as the spindle is aligned with the pusher bar for installation of the spindle in the sleeve;

FIG. 4 is a perspective view of the apparatus according to FIG. 1 shown subsequent to loading a spindle and a sleeve as in FIG. 2;

FIG. 5 is a perspective view of a portion of the apparatus according to FIG. 1 shown after installation of the spindle in the sleeve and withdrawal of fingers from between the spindle and the sleeve;

FIG. 6 is an end view of a portion of an apparatus according to an embodiment of the present invention after installation of the spindle in the sleeve and prior to or during withdrawal of fingers from between the spindle and the sleeve;

FIG. 7 is a perspective view of an alternative embodiment of an apparatus for mounting a sleeve on a spindle according to an embodiment of the present invention;

FIG. 8 is a perspective view of the apparatus of FIG. 7 on which a sleeve and a spindle have been mounted, prior to mounting the sleeve on the spindle;

FIG. 9 is a side view of the apparatus of FIG. 7 on which a spindle, but no sleeve, has been mounted;

FIG. 10 is an exploded perspective view of a finger frame arrangement according to an embodiment of the present invention; and FIGS. 11A and 11B are perspective and end views of a spindle holder portion according to an embodiment of the present invention.

DETAILED DESCRIPTION

An apparatus 21 for mounting a sleeve 23 (FIGS. 2–6) on a spindle 25 (FIGS. 2–6) according to an embodiment of the present invention is shown in FIG. 1. The sleeve 23 is preferably a wet PVA (or similar material) brush of the type used to polish substrates for high technology applications that is mounted on a spindle 25 made of TEFLON or similar type material.

The apparatus 21 preferably includes a frame 27 and a finger arrangement 29 movably mounted on the frame, such as by a carriage 31 of a conventional type. The carriage 31 is preferably movable along a track 33 by any suitable drive device (not shown), such as by an electric motor and belt or chain arrangement.

The finger arrangement 29 preferably includes a plurality of fingers 35 arranged at a common first radius around an imaginary centerline of the finger arrangement (the centerline of the fingers). In operating the apparatus 21, the sleeve 23 is mounted on the finger arrangement 29 around the fingers 35 as seen in FIG. 2. The fingers 35 are movable radially outwardly from the first radius to a second radius upon application of an outwardly directed force on the fingers. When the outwardly directed force is applied to move the fingers 35 radially outwardly, the internal dimensions of the sleeve 23 mounted on the fingers are expanded to facilitate installation of the spindle 25, preferably by substantially even application of force by the fingers at the different positions of the fingers.

The finger arrangement 29 preferably includes a finger frame 37 to which the fingers 35 are movably connected, the finger frame having an axial opening 39 therein about which the fingers are arranged at predetermined angular relationships, preferably every 90°, although more or fewer fingers may be provided. Preferably, means for urging (not shown) the fingers 35 toward the first radius, such as springs or resilient members such as flexible rubber or other resilient material pads, are provided in connection with the finger arrangement and are disposed in the finger frame 37. If desired or necessary, of course, no urging means may be provided and an operator can manually urge the fingers to lie on the first radius.

Preferably, the force for moving the fingers 35 to the second radius is provided by forcing the spindle 25, which preferably has an outer radius at least as large as the internal radius of the sleeve, through the axial opening 39 and between the fingers to cause sufficient expansion of the internal dimensions of the sleeve 23 to permit installation of the spindle between the fingers and in the internal opening of the sleeve. The resulting shape of the sleeve 23 in which the fingers 35 and the spindle 25 are disposed is substantially as shown in FIG. 6.

As seen in FIGS. 1–5, a clamping arrangement 41 is preferably fixed to the frame 27 in front of the finger arrangement 29. The clamping arrangement 41 preferably includes a plurality of clamps 43 mounted on a clamp frame 45 (FIGS. 1, 3, and 5). The clamps 43 are preferably movably arranged about an imaginary centerline, the imaginary centerline being substantially coaxial with the centerline of the finger arrangement 29. Preferably, as seen, for example, in FIG. 6, each of the clamps 43 is angularly offset, relative to the centerline of the fingers and the centerline of the clamps, from an angular position of any of the fingers.

Each of the clamps 43 is preferably movable from a radially outward position to a radially inward position. Each of the clamps 43 is preferably pivotably mounted about a point 47 on an arm 49 to facilitate even application of pressure on the sleeve by the clamps, i.e., the clamps are preferably adapted to level themselves to adapt to the exterior contour of the sleeve. The arms 49 are also preferably pivotably mounted to the clamp frame 45 at a pivot point 51. The clamps 43 may be moved from the radially outward position to the radially inward position by any suitable arrangement, such as by hydraulic or pneumatic pistons controlled by a controller, by electric drives such as solenoids controlled by a controller, or by cam-type arrangements driven by an electric drive controlled by a controller, or arranged to move the clamps upon movement of other movable components of the apparatus 21. Preferably, the arms 49 are linked together about the frame 45 by a linking arrangement 53 that causes all of the arms to move inwardly and outwardly together.

After installation of the spindle 25 between the fingers 35 in the sleeve 23, the finger arrangement 29 is moved on the carriage 31 forwardly toward the clamping arrangement 41 so that the sleeve is disposed inside of the clamps 43, and the clamps 43 clamp the sleeve. The fingers 35 are preferably installed in the sleeve 23 manually, although, in addition to permitting removal of the fingers from the sleeve, the clamping arrangement 41 may be used to hold the sleeve relative to the fingers during installation of the fingers into the sleeve, if desired or necessary. Preferably, the finger arrangement 29 is movable on the frame 21, i.e., on the carriage 31, from a first position (seen in, for example, FIGS. 1–2 and 4–5) in which there is a space between a leading end of the fingers 35 and a leading end of the clamping arrangement 41 to a second position (seen in FIGS. 3 and 6) in which the leading end of the fingers is disposed inside of the clamps of the clamping arrangement.

As seen in FIG. 3, to force the spindle 25 between the fingers 35 and into the sleeve 23, a pusher bar 55 (FIG. 3) is preferably fixed to the frame 27 behind the carriage 31. A centerline of the pusher bar 55 is preferably substantially coaxial with the centerline of the finger arrangement 29. The pusher bar 55 preferably forms part of a spindle loading arrangement, the spindle loading arrangement including a bed 57 attached to a rear side of the finger arrangement 29 opposite the clamping arrangement, the bed being adapted to hold a spindle 25 in position relative to the centerline of the finger arrangement. The spindle loading arrangement preferably also includes a slide 59 disposed above the pusher bar 55 on which a spindle 25 to which a sleeve 23 is to be mounted is loaded and is adapted to slide to the bed 57. The bed 57 is preferably disposed under the pusher bar 55 when the finger arrangement 29 is moved to a most rearward position, as seen in FIGS. 1 and 2. When the carriage 31 moves on the track 33 toward the clamping arrangement 41 and thereby moves the finger arrangement 29 and the bed 57 attached thereto, the bed is drawn from under the pusher bar 55 and the spindle 25 slides from the slide 59 onto the bed.

When the carriage 31 moves on the track 33 toward the pusher bar 55, the spindle 25 resting in the bed 57 contacts the forward end of the pusher bar and is driven through the axial opening 39 in the finger frame 37 and between the fingers 35. The fingers 35 are forced outwardly by the spindle 25 as the carriage 31 moves the finger arrangement 29 toward the pusher bar 55, and the spindle 25 is received in the sleeve 23. Then, as seen in FIG. 5, the carriage 31 is moved on the track 33 toward the clamping arrangement 41 for removal of the fingers 35 from between the sleeve 23 and the spindle 25. The clamps 43 of the clamping arrangement clamp the sleeve 23 at points that are preferably angularly offset from the fingers 35 to facilitate withdrawing the fingers from the sleeve as seen in FIG. 6.

In operation of the apparatus 21 in connection with a method for loading the sleeve 23 on the spindle 25 according to an embodiment of the present invention, as seen in FIG. 2, the sleeve 23 having an internal opening having an inner sleeve radius is loaded on the finger arrangement 29 including a plurality of fingers 35 arranged at a common first radius around an imaginary centerline of the finger arrangement, the first radius being no larger than the sleeve radius. The fingers 35 are moved radially outwardly from the first radius to a second radius larger than an outer spindle radius of a spindle 25, preferably under application of a force applied by forcing a leading end of the spindle between the fingers. Preferably, in this manner, the spindle 25 is installed in the internal opening of the sleeve 23.

Preferably, as seen in FIG. 3, the spindle 25 is installed by supporting the spindle on a bed 57 fixed behind the finger arrangement 29 such that a centerline of the spindle is substantially coaxial with the centerline of the fingers 35 and applying a force to a trailing end of the spindle. The force is preferably applied by moving the finger arrangement 29 and the bed 57 relative to a pusher bar 55 disposed behind the finger arrangement, the pusher bar having a centerline substantially coaxially arranged relative to the centerline of the spindle and the centerline of the fingers.

As seen with reference to FIGS. 2 and 3, the spindle 25 is preferably loaded on the bed 57 by placing the spindle on a slide 59 disposed behind the finger arrangement 29, moving the finger arrangement and the bed relative to the slide, and sliding the spindle down the slide to the bed. When the finger arrangement 29 and the bed 57 are moved relative to the pusher bar 55 to install the spindle 25 in the sleeve 23, the bed is disposed below the pusher bar. After installation of the spindle 25 in the sleeve 23, the fingers 35 are withdrawn from the clamped sleeve 25, preferably by clamping the sleeve with clamps 43 arranged at angularly different positions relative to the fingers such that pressure is applied to portions of the sleeve angularly removed from the fingers, as seen in FIGS. 6 (prior to or during withdrawal) and 5 (after withdrawal).

An alternative embodiment of an apparatus 121 for mounting a sleeve 123 (FIG. 8) on a spindle 125 (FIGS. 8 and 9) is seen in FIG. 7. The apparatus 121 includes a frame 127 and a finger arrangement 129 attached to the frame. As seen in FIGS. 7–10, the finger arrangement 129 preferably includes a plurality of fingers 131 movable from a first radius to a second radius about an imaginary centerline, and a driven, reciprocable rod 133 arranged to move between the fingers to move them from the first radius to the second radius. In operation, the finger arrangement 129 permits expansion of a sleeve, such as a wet PVA brush, from a first inside diameter to a larger second inside diameter, to facilitate mounting of the sleeve on a spindle.

The apparatus 121 further includes a spindle holder 135 movably mounted on the frame 127. The spindle holder 135 is movable from a first position at a first distance from the finger arrangement 129 to a second position at a second distance from the finger arrangement, the second distance being less than the first distance. The spindle holder 135 includes a holder portion 137 (FIGS. 11A and 11B) adapted to hold the spindle 125 to be received in the sleeve 123 mounted on the fingers 131 so that the spindle is substantially coaxial with the centerline of the fingers.

When the spindle holder 135 is in the first position, it is loaded with the spindle 125 in the holder portion 137 and a leading end 139 of the spindle is disposed at an axial distance before the ends 141 of the fingers 131. When the spindle holder 135 is moved to the second position, the leading end 139 of the spindle 125 is disposed axially forward of the ends 141 of the fingers 131. By controlling a position of the sleeve 123 when it is mounted on the fingers 131, such as by preventing the sleeve from moving past a particular axial position on the fingers, the position of the leading end 139 of the spindle 125 relative to the sleeve can be precisely controlled by controlling the location of the second position.

As seen in FIGS. 7–9, the spindle holder 135 is preferably mounted on a carriage 143 that slides on a track 145 on the frame 127, and the carriage is preferably reciprocably movable along the track by a conventional drive arrangement (not shown) such as an electric motor, drive belts or chains, hydraulic or pneumatic arrangements, or the like. After the rod 133 is driven between the fingers 131 to expand the sleeve 123 mounted on the fingers, the carriage 143 on which the spindle holder 135 is mounted moves the spindle holder and the spindle 125 mounted thereon from the first position to the second position. This causes the leading end 139 of the spindle 125 to enter the opening of the sleeve 123 between the fingers 131 while, at the same time, the rod 133 is withdrawn from between the fingers, preferably at the same rate at which the spindle enters.

As seen in FIGS. 11A and 11B, the holder portion 137 preferably includes a ridge 147 for limiting axial movement of the spindle 125 in a direction away from the finger arrangement 129. An internal dimension of the holder portion 147 is preferably semicircular for holding a circular spindle 125 that preferably has an enlarge portion 149 that contacts the ridge 147, which is preferably a smaller diameter semicircle than the rest of the holder portion, but may be any suitable structure that can cooperate with the spindle for preventing axial movement of the spindle. By providing a structure such as the ridge 147, when the spindle 125 is caused to enter the sleeve 123, contact between the spindle and the sleeve or other structures will not cause the spindle to be prevented from entering the sleeve.

As seen in FIGS. 7–9, a clamping arrangement 151 for clamping the sleeve at least during withdrawal of the fingers 131 from the sleeve after insertion of the spindle 125 is movably mounted, together with the spindle holder 135, on the frame 127 between the spindle holder and the finger arrangement 129. The clamping arrangement 151 is movable from a first position at a first distance from the finger arrangement to a second position wherein the clamping arrangement surrounds at least a portion of the fingers.

The clamping arrangement 151 preferably includes a frame 153 and a plurality of clamps 155 movably mounted on the frame and movable from a first radius about a clamp centerline substantially coaxial with the centerline of the fingers 131 to a second radius closer to the centerline of the clamps. The clamps are angularly offset about the centerline of the clamps relative to an angular position of the fingers about the centerline of the fingers. The angular offset facilitates withdrawal of the fingers 131 after installation of the spindle 125 in the sleeve 123. The clamps 155 may be driven by any suitable drive 157, such as a solenoid, a hydraulic or pneumatic drive, or a gear arrangement, as desired or necessary.

As seen in FIG. 10 the finger arrangement 129 includes a finger frame 159 to which the fingers 131 are movably connected. The fingers 131 preferably each include a first portion 131' lying on a surface of an imaginary truncated cone from the finger frame 159 to a first point forward of the frame, and a second portion 131" substantially parallel with the centerline of the fingers, and the rod 133 preferably includes a leading end 161 in a shape of a truncated cone. The rod 133 is preferably also provided with grooves 162 in which the fingers 131 are slidable to facilitate maintaining alignment of the fingers.

After a sleeve 123 is mounted around the second portions of the fingers 131, the rod 133 is preferably driven forward into the volume defined by the first portions 131' of the fingers 131 to expand the sleeve sufficiently to permit the spindle 125 to be moved into the larger diameter opening of the sleeve. The rod 133 is preferably driven by a suitable drive 163 such as an electric motor, a hydraulic, or a pneumatic drive, that advances the rod between the fingers. The truncated cone-shaped leading end 161 contacts the first portions 131" of the fingers 131 that preferably define the same angle with the centerline of the fingers as the leading end and, as the leading end is driven further between the fingers, the fingers are forced apart. If desired or necessary, the wall of the truncated cone-shaped leading end 161 may form a different angle with the centerline of the fingers than the first portions 131' of the fingers form with the centerline of the fingers. A cylindrical portion 165 of the rod 133 that is preferably about the same diameter as the spindle 125 on which the sleeve 123 is to be mounted is eventually driven between the second portions 131" of the fingers 131 to completely expand the fingers and the sleeve.

In a method of operation of a method according to the present invention, a sleeve 123 is mounted on a spindle 125 by first mounting the sleeve on the plurality of fingers 131, preferably on the second portions 131" of the fingers that extend parallel to the direction of the centerline of the fingers. The fingers 131 are moved radially from the first radius about the centerline of the fingers to the second radius further from the centerline of the fingers than the first radius by a radially outwardly directed force on the fingers that is applied by driving the rod 133 between the fingers. In this way, the sleeve 123 mounted on the second portions 131" of the fingers 131 is expanded.

A spindle 125 is mounted on the spindle holder 135. Preferably, the spindle 125 has an enlarged diameter portion 149 that rests in a semicircular holder portion 137 of the spindle holder 135 and is limited in its ability to move axially away from the finger arrangement 129 by a ridge 147 or other structure that interferes with the large diameter portion of the spindle for limiting axial movement relative to the spindle holder. The spindle holder 135 is preferably mounted on the carriage 143 that moves on the track 145 and the spindle holder is moved on the carriage so that the leading end 139 of the spindle 125 is received in the opening of the sleeve 123 that has been expanded to the second radius by the fingers 131 and the rod 133, the spindle being received between the fingers. Because the sleeve 123 is somewhat flexible, when the fingers 131 move to the second radius, the sleeve is not expected to form a perfect circle. The radially outwardly directed force on the fingers 131 that is applied by the rod 133 is preferably removed as the spindle 125 is introduced between the fingers by withdrawing the rod as the spindle is introduced, the spindle preferably being close to or adjacent to the rod as it is withdrawn and preferably advancing into the sleeve at substantially the same rate as the rod is withdrawn.

After the spindle 125 is installed and the rod 133 is removed, the fingers 131 are withdrawn from the sleeve 123, preferably by moving the spindle holder 135 together with the spindle 125 on which the sleeve is mounted back to the first position of the spindle holder. Prior to moving the spindle holder 135, the clamping arrangement 151 preferably clamps the sleeve 123 with clamps 155 arranged at angularly offset locations relative to the fingers 131 to hold the sleeve relative to the spindle 125. The clamping arrangement 151 is preferably mounted on the same carriage 143 as the spindle holder 135 so that the clamps maintain the clamping pressure on the sleeve and the spindle as the spindle holder and the clamping arrangement move away from the finger arrangement 129.

What is claimed is:

1. An apparatus for mounting a sleeve on a spindle, comprising:
    a frame; and
    a finger arrangement mounted on the frame, the finger arrangement including a plurality of fingers arranged at a common first radius around an imaginary centerline of the finger arrangement, the fingers being configured to extend along an entire length of the sleeve and movable radially outwardly from the first radius to a second radius upon application of an outwardly directed force to allow the insertion of a spindle into the sleeve;
    a spindle loading arrangement mounted on the frame and configured to hold the spindle in axial alignment with the sleeve for insertion of the spindle into the sleeve; and
    a track and carriage on the frame for moving the finger arrangement and the spindle toward one another to insert the spindle into the sleeve.

2. The apparatus as set forth in claim 1, further comprising a clamping arrangement fixed to the frame in front of the finger arrangement.

3. The apparatus as set forth in claim 2, wherein the clamping arrangement includes a plurality of clamps movably arranged about an imaginary centerline, the imaginary centerline being substantially coaxial with the centerline of the finger arrangement.

4. The apparatus as set forth in claim 3, wherein each clamp of the plurality of clamps is movable from a radially outward position to a radially inward position to hold the sleeve in place on the spindle during removal of the fingers from the sleeve.

5. The apparatus as set forth in claim 3, wherein each clamp of the plurality of clamps is pivotably mounted about a point on an arm.

6. The apparatus as set forth in claim 3, wherein each clamp of the plurality of clamps is angularly offset, relative to the centerline of the fingers and the centerline of the clamps, from an angular position of any of the fingers.

7. The apparatus as set forth in claim 2, wherein the finger arrangement is movable on the frame by the carriage from a first position in which there is a space between a leading end of the fingers and a leading end of the clamping arrangement to a second position in which a leading end of the fingers is disposed inside of the clamping arrangement.

8. The apparatus as set forth in claim 2, wherein the spindle loading arrangement comprises a pusher bar fixed to the frame behind the carriage, a centerline of the pusher bar being substantially coaxial with the centerline of the finger arrangement.

9. The apparatus as set forth in claim 8, wherein the spindle loading arrangement includes a bed attached to a rear side of the finger arrangement opposite the clamping arrangement, the bed being adapted to hold a spindle in position relative to the centerline of the finger arrangement.

10. The apparatus as set forth in claim 9, wherein the spindle loading arrangement further includes a slide disposed above the pusher bar on which a spindle to which a sleeve is to be mounted is loaded and is adapted to slide to the bed.

11. The apparatus as set forth in claim 9, wherein the bed is disposed under the pusher bar when the finger arrangement is moved to a most rearward position.

12. The apparatus as set forth in claim 1, further comprising a clamp configured to hold the sleeve in place on the spindle during removal of the fingers from the sleeve.

13. The apparatus as set forth in claim 1, wherein the spindle loading arrangement is mounted on the carriage and movable along the track to insert the spindle into the sleeve.

14. The apparatus as set forth in claim 13, further comprising a clamp mounted on the carriage and movable along the track to hold the sleeve in place on the spindle during removal of the fingers from the sleeve.

15. The apparatus as set forth in claim 1, wherein the finger arrangement is mounted on the carriage and movable along the track to insert the spindle into the sleeve.

16. The apparatus as set forth in claim 1, wherein the fingers include first free ends for receiving the sleeve and second ends of the fingers are provided with a finger expansion mechanism.

17. The apparatus as set forth in claim 16, wherein the spindle is inserted from the first free ends of the fingers.

18. The apparatus as set forth in claim 16, wherein the spindle is inserted from the second ends of the fingers.

19. An apparatus for mounting a sleeve on a spindle, comprising:
    a frame; and
    a finger arrangement mounted on the frame, the finger arrangement including a plurality of fingers arranged at a common first radius around an imaginary centerline of the finger arrangement, the fingers being movable radially outwardly from the first radius to a second radius upon application of an outwardly directed force to allow the insertion of a spindle into the sleeve;

a spindle loading arrangement mounted on the frame and configured to hold the spindle in axial alignment with the sleeve for insertion of the spindle into the sleeve;

a track and carriage on the frame for moving the finger arrangement and the spindle toward one another to insert the spindle into the sleeve; and a clamp configured to hold the sleeve in place on the spindle during removal of the fingers from the sleeve.

20. The apparatus as set forth in claim 19, wherein the spindle loading arrangement is mounted on the carriage and movable along the track to insert the spindle into the sleeve.

21. The apparatus as set forth in claim 19, wherein the finger arrangement is mounted on the carriage and movable along the track to insert the spindle into the sleeve.

* * * * *